United States Patent
Hashimoto et al.

(10) Patent No.: US 10,027,209 B2
(45) Date of Patent: Jul. 17, 2018

(54) METHOD FOR MANUFACTURING A STATOR FOR A ROTATING ELECTRICAL MACHINE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Takeshi Yokoyama, Anjo (JP); Hiroyuki Tanaka, Anjo (JP); Kazuya Iwatsuki, Takahama (JP); Takahiro Hashimoto, Nishio (JP); Hisao Miyata, Anjo (JP); Kirika Yoshikawa, Anjo (JP); Takanori Ota, Anjo (JP); Hirotaka Kawaura, Toyota (JP); Norihiko Akao, Nisshin (JP); Tetsuya Sugimoto, Chiryu (JP); Yukihiko Nakagami, Nagakute (JP)

(73) Assignees: AISIN AW CO., LTD., Anjo (JP); TOYOTA JIDOSHA KABUSHIKI KAISHA, Toyota (JP)

(*) Notice: Subject to any disclaimer, the term of this patent is extended or adjusted under 35 U.S.C. 154(b) by 281 days.

(21) Appl. No.: 14/781,188

(22) PCT Filed: May 12, 2014

(86) PCT No.: PCT/JP2014/062583
§ 371 (c)(1),
(2) Date: Sep. 29, 2015

(87) PCT Pub. No.: WO2014/185376
PCT Pub. Date: Nov. 20, 2014

(65) Prior Publication Data
US 2016/0056697 A1   Feb. 25, 2016

(30) Foreign Application Priority Data
May 17, 2013   (JP) .................. 2013-105347

(51) Int. Cl.
| H02K 15/085 | (2006.01) |
| H02K 15/06 | (2006.01) |
| H02K 15/00 | (2006.01) |
| H02K 15/02 | (2006.01) |

(52) U.S. Cl.
CPC ....... H02K 15/085 (2013.01); H02K 15/0056 (2013.01); H02K 15/024 (2013.01); H02K 15/062 (2013.01)

(58) Field of Classification Search
CPC ...... A01N 43/36; A01N 43/56; A01N 43/647; A01N 43/78; A01N 61/00; C07D 207/06;
(Continued)

(56) References Cited

U.S. PATENT DOCUMENTS 5,592,731 A * 1/1997 Huang .............. H02K 1/16
                                                 29/596
6,812,610 B2 * 11/2004 Kim ................. H02K 3/28
                                                 310/180
(Continued)

FOREIGN PATENT DOCUMENTS

| CN | 102990482 A | 3/2013 |
| JP | H09-308142 A | 11/1997 |

(Continued)

OTHER PUBLICATIONS

Apr. 11, 2016 Search Report issued in European Patent Application No. 14 79 8213.6.

*Primary Examiner* — Minh Trinh
(74) *Attorney, Agent, or Firm* — Oliff PLC

(57) ABSTRACT

A method for manufacturing a stator for a rotating electrical machine by placing coils in a stator core, wherein each of a plurality of teeth formed in a radial pattern in an inner periphery of an annular yoke portion in the stator core has tip-end parallel side surfaces formed in its tip end portion having a constant width in a circumferential direction, has (Continued)

intermediate tilted side surfaces continuous with the tip-end parallel side surfaces and formed in its portion whose width in the circumferential direction increases closer to an outer periphery, and has base-end parallel side surfaces continuous with the intermediate tilted side surfaces and formed in its base end portion having a constant width in the circumferential direction.

8 Claims, 6 Drawing Sheets

(58) Field of Classification Search
CPC .. C07D 211/12; C07D 401/06; C07D 403/06; C07D 405/04; C07D 405/06
See application file for complete search history.

(56) References Cited

U.S. PATENT DOCUMENTS

| | | | |
|---|---|---|---|
| 7,726,005 B2* | 6/2010 | Stroebel | H02K 3/28 29/564.5 |
| 2005/0110361 A1 | 5/2005 | Blouin et al. | |
| 2010/0066198 A1 | 3/2010 | Fubuki et al. | |
| 2012/0112594 A1 | 5/2012 | Sano et al. | |
| 2012/0139383 A1* | 6/2012 | Wolf | H02K 3/28 29/596 |
| 2012/0256511 A1 | 10/2012 | Haruno | |
| 2013/0328435 A1* | 12/2013 | Wolf | H02K 1/243 310/184 |
| 2016/0056697 A1* | 2/2016 | Hashimoto | H02K 15/062 29/596 |

FOREIGN PATENT DOCUMENTS

| | | |
|---|---|---|
| JP | 2000-041365 A | 2/2000 |
| JP | 2006-166610 A | 6/2006 |
| JP | 2007-512797 A | 5/2007 |
| JP | 2007-221913 A | 8/2007 |
| JP | 2008-160939 A | 7/2008 |
| JP | 2008-220093 A | 9/2008 |
| JP | 2012-223056 A | 11/2012 |
| JP | 2012-257409 A | 12/2012 |
| JP | 2012-257410 A | 12/2012 |
| WO | 2005/107037 A1 | 11/2005 |

* cited by examiner

METHOD FOR MANUFACTURING A STATOR FOR A ROTATING ELECTRICAL MACHINE

BACKGROUND

The present disclosure relates to a method for manufacturing a stator for a rotating electrical machine by placing coils in a stator core.

Methods for manufacturing a stator for a rotating electrical machine include a method in which coils are placed in a stator core shaped as a single-piece member and a method in which a stator core is divided into segment cores, coils are placed on the segment cores, and the segment cores having the coils placed thereon are coupled to each other. The coil can be formed by winding a collection of a plurality of thin magnet wires or by winding a single rectangular wire.

For example, Japanese Patent Application Publication No. 2012-257410 discloses an apparatus for manufacturing a motor stator in which a plurality of trapezoidal coils formed by bending a rectangular conductor having a rectangular section are inserted onto a plurality of teeth in a stator core. This manufacturing apparatus has a coil shape restricting member that restricts the trapezoidal coil to an obliquely deformed state. The trapezoidal coil is inserted on the tooth while preventing twisting of the windings by the coil shape restricting member

SUMMARY

In the manufacturing apparatus of Japanese Patent Application Publication No. 2012-257410, however, the coil shape restricting member constantly restricts the trapezoidal coil to the obliquely deformed state until the trapezoidal coil is inserted to a proper position on the tooth. In the Japanese Patent Application Publication No. 2012-257410, it is therefore difficult to insert the trapezoidal coil onto the tooth in the case where it is desired that the tooth have a larger width in the circumferential direction in its base end portion.

The present disclosure according to an exemplary aspect provides a method for manufacturing a stator for a rotating electrical machine in which the last coil to be placed on a tooth can be smoothly placed even if the tooth has a larger width in the circumferential direction in its base end portion.

According to one aspect of the present disclosure, a method for manufacturing a stator for a rotating electrical machine by placing coils in a stator core, wherein each of a plurality of teeth formed in a radial pattern in an inner periphery of an annular yoke portion in the stator core has tip-end parallel side surfaces formed in its tip end portion having a constant width in a circumferential direction, has intermediate tilted side surfaces continuous with the tip-end parallel side surfaces and formed in its portion whose width in the circumferential direction increases closer to an outer periphery, and has base-end parallel side surfaces continuous with the intermediate tilted side surfaces and formed in its base end portion having a constant width in the circumferential direction, and the last coil is placed on the tooth of the stator core by performing a first insertion step of deforming the last coil so that each of an outer peripheral end of a one-side conductor portion located on one side in the circumferential direction of the last coil and an inner peripheral end of the other-side conductor portion located on the other side in the circumferential direction of the last coil has an acute-angled corner, and inserting the outer peripheral end of the one-side conductor portion into an opening of a one-side slot located on the one side in the circumferential direction of the tooth, a second insertion step of inserting the outer peripheral end of the one-side conductor portion to a boundary position between the intermediate tilted side surface and the base-end parallel side surface in the one-side slot, and inserting an outer peripheral end of the other-side conductor portion into an opening of the other-side slot located on the other side in the circumferential direction of the tooth, while maintaining the deformed state of the last coil, a third insertion step of, with the outer peripheral end of the one-side conductor portion being held stationary, inserting the outer peripheral end of the other-side conductor portion to a boundary position between the intermediate tilted side surface and the base-end parallel side surface in the other-side slot to return the deformed last coil to its original shape, and a fourth insertion step of causing the last coil to face the tooth and simultaneously inserting the one-side conductor portion and the other-side conductor portion into the one-side slot and the other-side slot.

The way in which the last coil is placed on a tooth having tip-end side surfaces, intermediate tilted side surfaces, and base-end parallel side surfaces is devised in the above method for manufacturing a stator for a rotating electrical machine.

In order to place the last coil on the tooth, in a first insertion step, the last coil is first deformed so that each of an outer peripheral end of a one-side conductor portion located on one side in the circumferential direction of the last coil and an inner peripheral end of the other-side conductor portion located on the other side in the circumferential direction of the last coil has an acute-angled corner. At this time, each of an inner peripheral end of the one-side conductor portion and an outer peripheral end of the other-side conductor portion has an obtuse-angled corner. The outer peripheral end of the one-side conductor portion is inserted into an opening of a one-side slot located on the one side in the circumferential direction of the tooth.

Next, in a second insertion step, the outer peripheral end of the one-side conductor portion is inserted to a boundary position between the intermediate tilted side surface and the base-end parallel side surface in the one-side slot while maintaining the deformed state of the last coil. At this time, the outer peripheral end of the other-side conductor portion is also inserted into an opening of the other-side slot located on the other side in the circumferential direction of the tooth. In the second insertion step, the last coil in the deformed state is placed on the tooth. The one-side conductor portion of the last coil can thus be made not to interfere with the tooth or the previous coil placed on the tooth.

In a third insertion step, the deformed last coil is then returned to its original state or initial state with the outer peripheral end of the one-side conductor portion being held stationary. At this time, the outer peripheral end of the other-side conductor portion is inserted to a boundary position between the intermediate tilted side surface and the base-end parallel side surface in the other-side slot. In the third insertion step, the last coil is placed on the tooth while returning the last coil from the deformed shape into its original shape. The other-side conductor portion of the last coil can thus be made not to interfere with the first coil placed on the tooth.

Thereafter, in a fourth insertion step, the last coil is caused to face the tooth, and the one-side conductor portion and the other-side conductor portion are then moved radially outward and simultaneously inserted into the one-side slot and the other-side slot.

Performing the first to fourth insertion steps thus allows the last coil to be easily placed on the tooth while avoiding interference, even if the tooth has the base-end parallel surfaces in its base end portion having a larger width in the circumferential direction.

Since the teeth have the tip-end parallel side surfaces, magnetic flux passing through the teeth when a current is applied to the coils is less likely to be saturated at the tip ends of the teeth. Moreover, forming the base-end parallel side surfaces in each tooth increases the width in the circumferential direction of the base end portion of each tooth, allowing a large amount of magnetic flux to pass therethrough. The use of the stator core having such a tooth shape can improve performance of rotating electrical machines.

In the above method for manufacturing a stator for a rotating electrical machine, the last coil can therefore be smoothly placed on the tooth even if the tooth has a larger width in the circumferential direction of its base end portion.

DETAILED DESCRIPTION OF THE EMBODIMENTS

Preferred modes for carrying out the above method for manufacturing a stator for a rotating electrical machine will be described.

In the above method for manufacturing a stator for a rotating electrical machine, the outer peripheral end of the one-side conductor portion and the outer peripheral end of the other-side conductor portion refer to the ends that are located on the yoke side when the coil is placed on the outer periphery of the tooth of the stator core.

The coils to be placed on the teeth of the stator core prior to the last coil can be sequentially placed on the teeth of the stator coil one by one in the circumferential direction.

In the above method for manufacturing a stator for a rotating electrical machine, the last coil may be formed by winding a rectangular wire in a plurality of layers arranged in the circumferential direction so that the coil conforms to a shape of the tooth which is formed by the tip-end parallel side surfaces, the intermediate tilted side surfaces, and the base-end parallel side surfaces.

In this case, the use of the rectangular wire can increase the ratio of the slot of the stator core occupied by the coil.

The last coil may be placed on an insulator that is made of an insulating resin and that has been initially attached to the tooth of the stator core.

In this case, the last coil separated from the insulator can be easily deformed.

The above method may use an assembly jig having a movable jig part that holds the last coil and that is placed so as to face an inner periphery of the tooth, and a base jig part where the movable jig part is movably placed, and in the first to fourth insertion steps, the last coil held by the movable jig part may be placed on the tooth by moving a roller provided in the movable jig part along a guide rail provided in the base jig part.

In this case, the use of the assembly jig having the movable jig part and the base jig part can further facilitate placement of the last coil on the tooth. A path in which the last coil is moved when being placed can be appropriately formed by moving the roller along the guide rail.

Embodiment

An embodiment of a method for manufacturing a stator for a rotating electrical machine will be described below with reference to the accompanying drawings.

Figure 7:
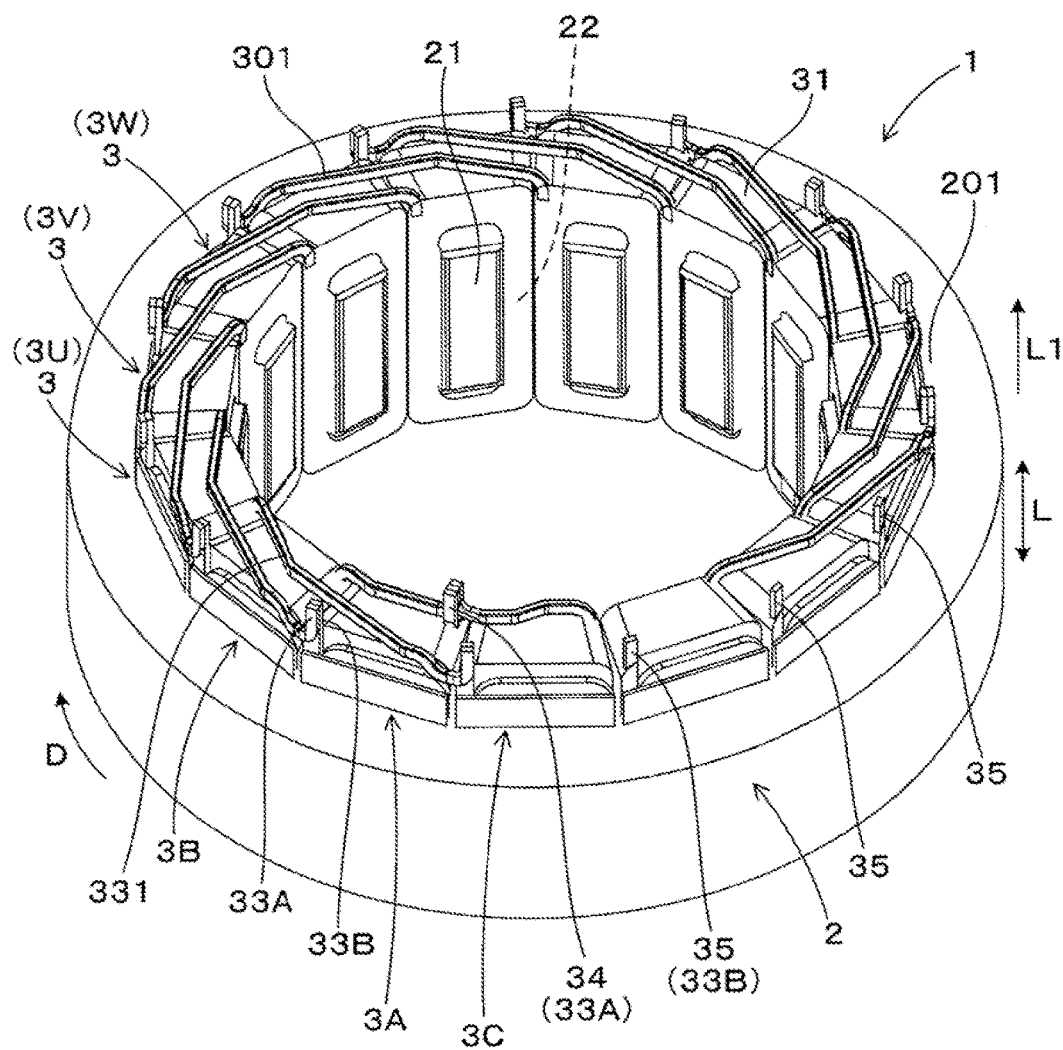
FIG. 7 is an illustration showing a stator according to the embodiment.

In a method for manufacturing a stator 1 for a rotating electrical machine according to the present embodiment, the stator 1 is manufactured by placing a plurality of coils 3 in a stator core 2 as shown in FIG. 7.

Figure 1:
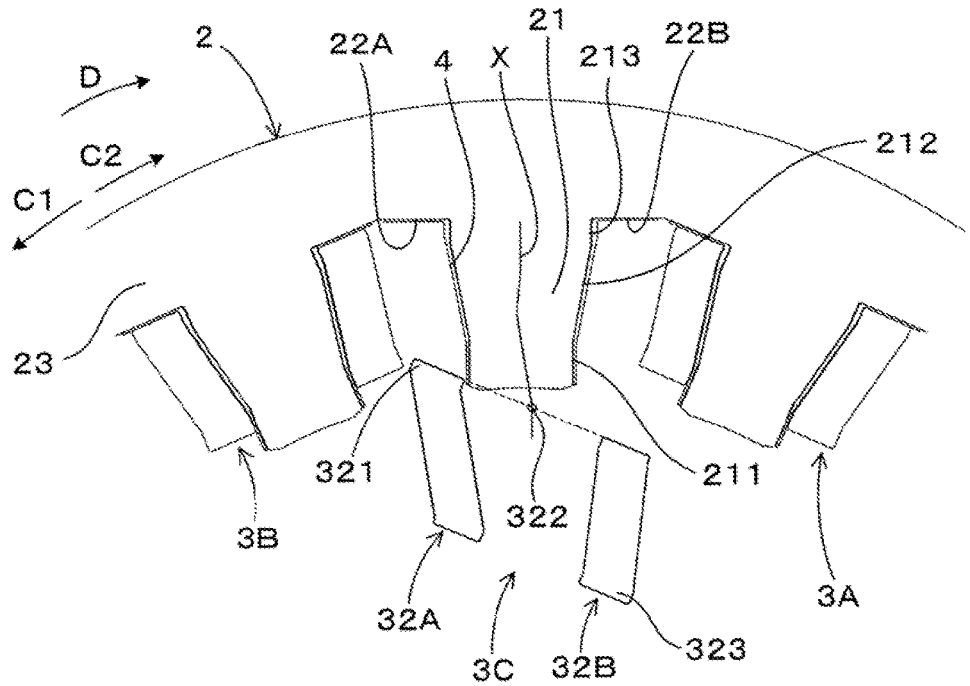
FIG. 1 is an illustration showing the state where the last coil is placed on a tooth in a first insertion step according to an embodiment.

As shown in FIG. 1, each of a plurality of teeth 21 that are formed in a radial pattern in the inner periphery of an annular yoke portion 23 of the stator core 2 has tip-end parallel side surfaces 221 formed in its tip end portion having a constant width in the circumferential direction, has intermediate tilted side surfaces 212 continuous with the tip-end parallel side surfaces 211 and formed in its portion whose width in the circumferential direction increases as closer to the outer periphery, and has base-end parallel side surfaces 213 continuous with the intermediate tilted side surfaces 212 and formed in its base end portion having a constant width in the circumferential direction.

The last coil 3C to be placed on the tooth 21 is placed on the tooth 21 by performing the first to fourth insertion steps.

As shown in FIG. 1, in the first insertion step, the last coil 3C is deformed into the shape of a rhombus so that each of an outer peripheral end 321 of a one-side conductor portion 32A located on one side C1 in the circumferential direction of the last coil 3C and an inner peripheral end 323 of the other-side conductor portion 32B located on the other side C2 in the circumferential direction of the last coil 3C has an acute-angled corner. The outer peripheral end 321 of the one-side conductor portion 32A is inserted into an opening of a one-side slot 22A located on the one side C1 in the circumferential direction of the tooth 21.

Figure 2:
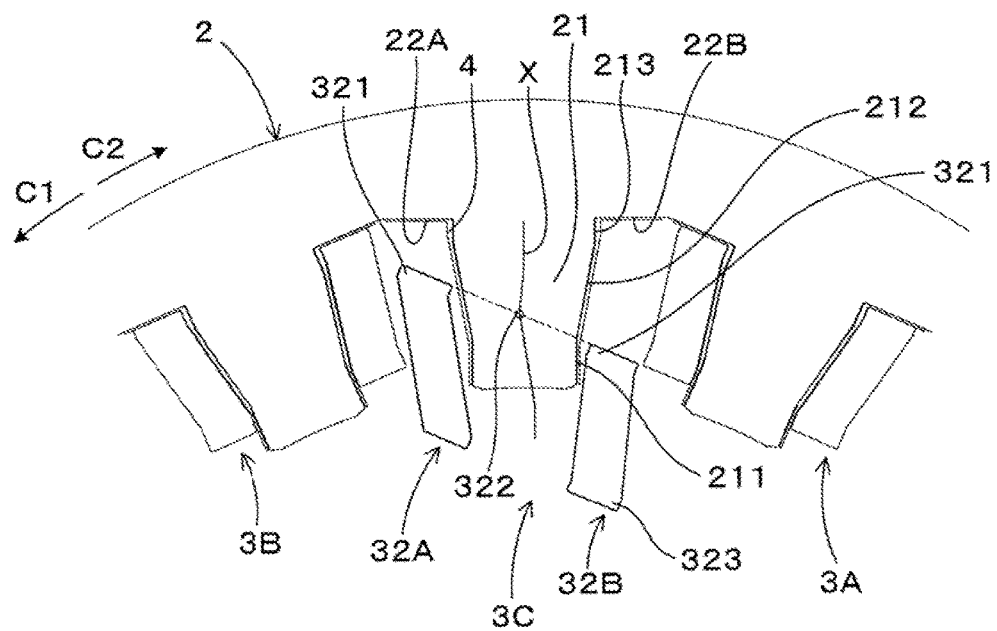
FIG. 2 is an illustration showing the state where the last coil is placed on the tooth in a second insertion step according to the embodiment.
Figure 3:
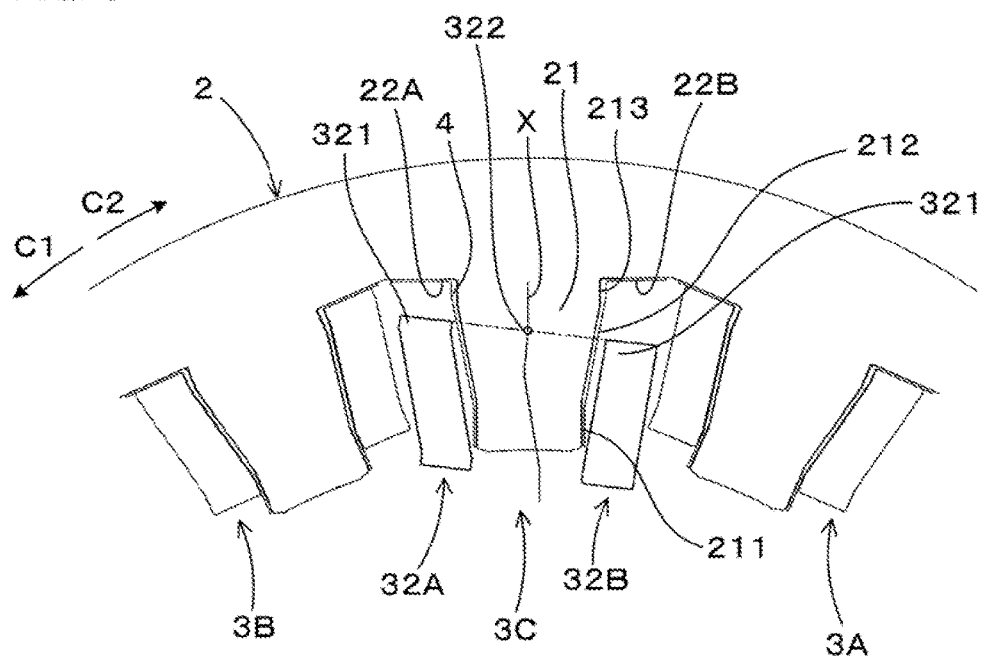
FIG. 3 is an illustration showing the state where the last coil is placed on the tooth in a third insertion step according to the embodiment.
Figure 4:
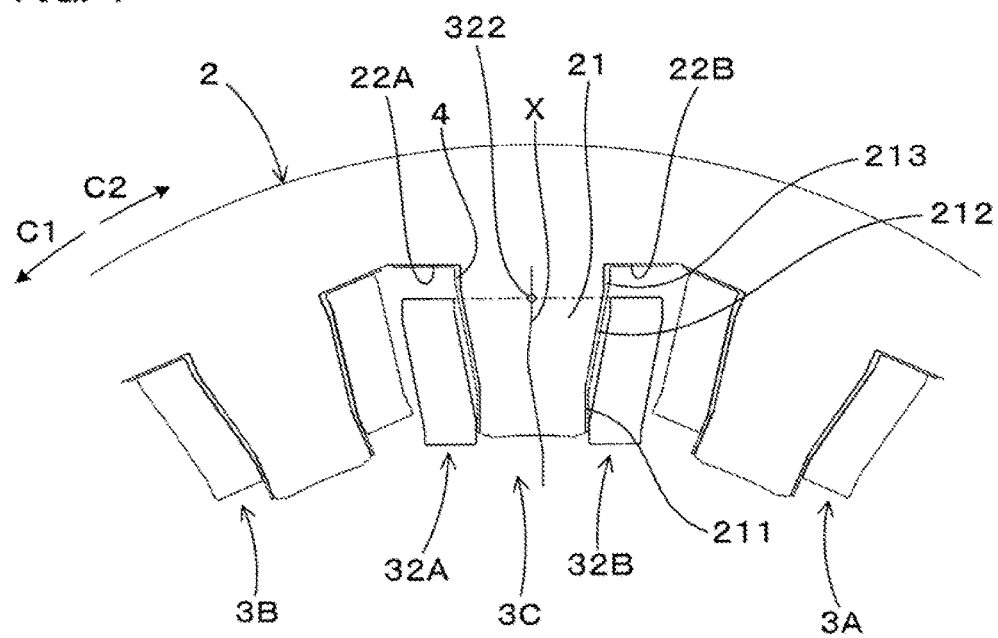
FIG. 4 is an illustration showing the state where the last coil is placed on the tooth in the third insertion step according to the embodiment.
Figure 5:
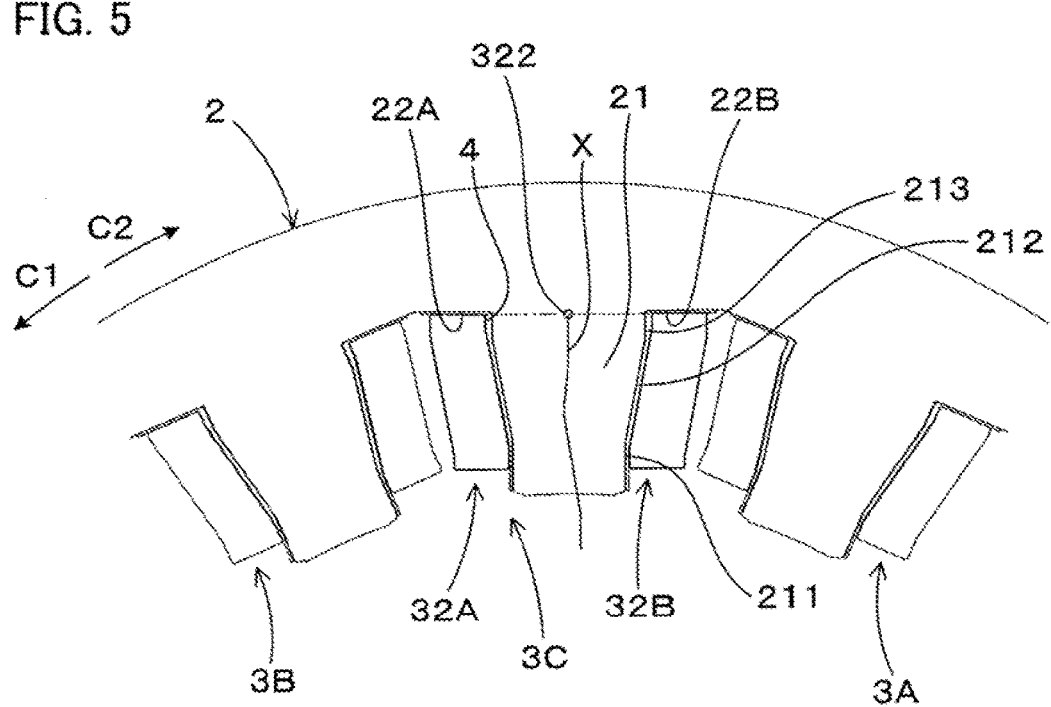
FIG. 5 is an illustration showing the state where the last coil has been placed on the tooth in a fourth insertion step according to the embodiment.

Then, as shown in FIG. 2, in the second insertion step, the outer peripheral end 321 of the one-side conductor portion 32A is inserted to the boundary position between the intermediate tilted side surface 212 and the base-end parallel side surface 213 in the one-side slot 22A, and an outer peripheral end 321 of the other-side conductor portion 32B is inserted into an opening of the other-side slot 22B located on the other side C2 in the circumferential direction of the tooth 21, while maintaining the deformed state of the last coil 3C. Thereafter, as shown in FIGS. 3 and 4, in the third insertion step, with the outer peripheral end 321 of the one-side conductor portion 32A being held stationary, the outer peripheral end 321 of the other-side conductor portion 32B is inserted to the boundary position between the intermediate tilted side surface 212 and the base-end parallel side surface 213 in the other-side slot 22B to return the deformed last coil 3C to its original shape. Subsequently, as shown in FIG. 5, in the fourth insertion step, the last coil 3C is caused to directly face the tooth 21, and the one-side conductor portion 32A and the other-side conductor portion 32B are simultaneously inserted into the one-side slot 22A and the other-side slot 22B, respectively. As used herein, the expression "directly face" means facing from the front.

The method for manufacturing the stator 1 for a rotating electrical machine according to the present embodiment will be described in detail below with reference to FIGS. 1 to 9.

As shown in FIG. 7, the stator 1 of the present embodiment is used for a three-phase rotating electrical machine, and is formed by repeatedly placing three-phase coils, namely U-phase, V-phase, and W-phase coils 3U, 3V, 3W, a plurality of times in the same order on the plurality of teeth 21 of the stator core 2.

The coil 3 of each phase has a coil body 31 formed by winding a rectangular wire 301 into a plurality of turns, a first end 33A extended at one end of the coil body 31 to one side L1 in the axial direction of the stator core 2, and a second end 33B extended at the other end of the coil body 31 to the one side L1 in the axial direction of the stator core 2. The first end 33A of the coil 3 of each phase is extended in a direction perpendicular to the axial direction L of the stator core 2 to extend axially outward of and across the coil bodies 31 of the coils 3 of the other phases so that the first end 33A is placed on the second end 33B of the coil 3 of the same phase.

The first end 33A of the rotation placement coil 3B of each phase is bent toward the outer periphery at an intermediate position 331 of a portion extending from the coil 3 to the coil 3 adjoining this coil 3 as a crossover wire. The first end 33A of the rotation placement coil 3B therefore does not interfere with the second end 33B of the coil 3 adjoining this rotation placement coil 3B when rotating and placing the rotation placement coil 3B onto the tooth 21.

The coils 3 of each phase are bonded together by the first ends 33A and the second ends 33B, forming U-phase, V-phase, and W-phase connected coils. The connected coils of the three phases are star-connected. A neutral point 34 where the first ends 33A of the coils 3 of the three phases are bonded together is provided at the first ends 33A of the connected coils of the three phases, and lead portions 35 connected to the outside are provided at the second ends 33B of the connected coils of the three phases.

The rectangular wire 301 forming the coil 3 of each phase has a substantially rectangular section, and is formed by coating the outer periphery of a conductor layer made of a copper material etc. with a coating layer made of a resin material etc. The rectangular wire 301 may have a flattened section having parallel flat surfaces.

The coil 3 of each phase of the present embodiment is a concentrated winding coil that is formed by extending the first end 33A and the second end 33B from the coil body 31 formed by winding the rectangular wire 301 in a plurality of turns. The coil 3 of each phase is individually attached one by one to the outer periphery of the tooth 21 so as to be placed in the slots 22A, 22B located on both sides in the circumferential direction of the tooth 21.

As shown in FIG. 1, the coil body 31 of the coil 3 of each phase is formed in a quadrilateral annular shape that is increased in diameter as closer to the outer periphery so as to conform to the shape of the tooth 21 which is formed by the tip-end parallel side surfaces 211, the intermediate tilted side surfaces 212, and the base-end parallel side surfaces 213. Of the coil body 31 of the coil 3 of each phase, a portion that is to face the tip-end parallel side surfaces 211 and a portion that is to face the base-end parallel side surfaces 213 are formed by winding the rectangular wire 301 into the shape of a rectangular parallelepiped, and a portion that is to face the intermediate tilted side surfaces 212 is formed by winding the rectangular wire 301 into the shape of a rectangular frustum. The coil body 31 of the coil 3 of each phase is formed by winding the rectangular wire 301 in two layers that overlap each other in the circumferential direction. The coil body 31 of the last coil 3C has such a shape that is increased in diameter as closer to the outer periphery. Accordingly, to be exact, the last coil 3C that is deformed in the first insertion step is deformed into a shape close to a rhombus.

The coil 3 of each phase is placed on the outer periphery of an insulator 4 as a resin that provides insulation between the coil 3 and the stator core 2. Each insulator 4 holds the coil body 31 on its outer periphery and is attached to the tooth 21.

Figure 8:
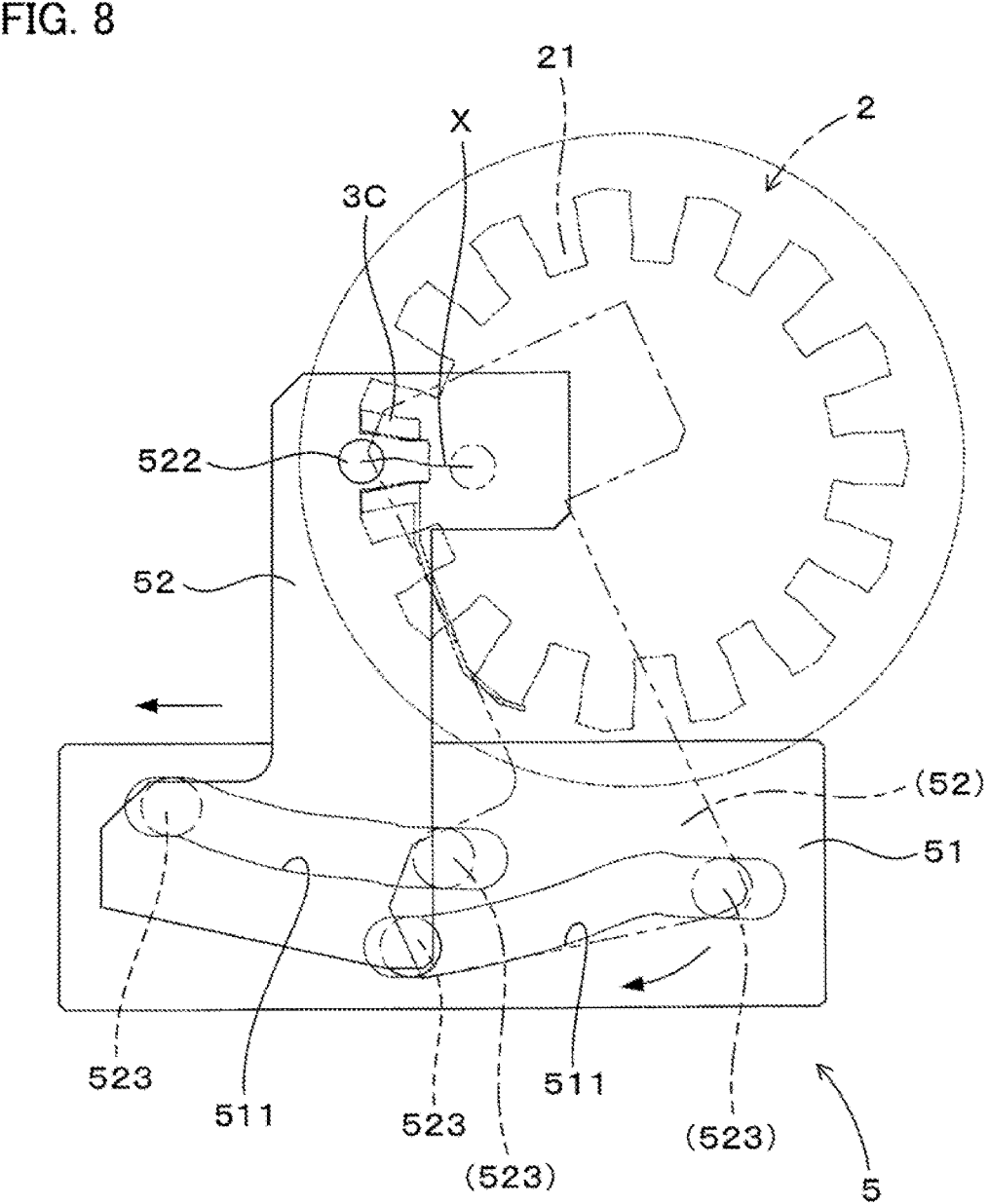
FIG. 8 is an illustration conceptually showing operation of an assembly jig according to the embodiment.
Figure 9:
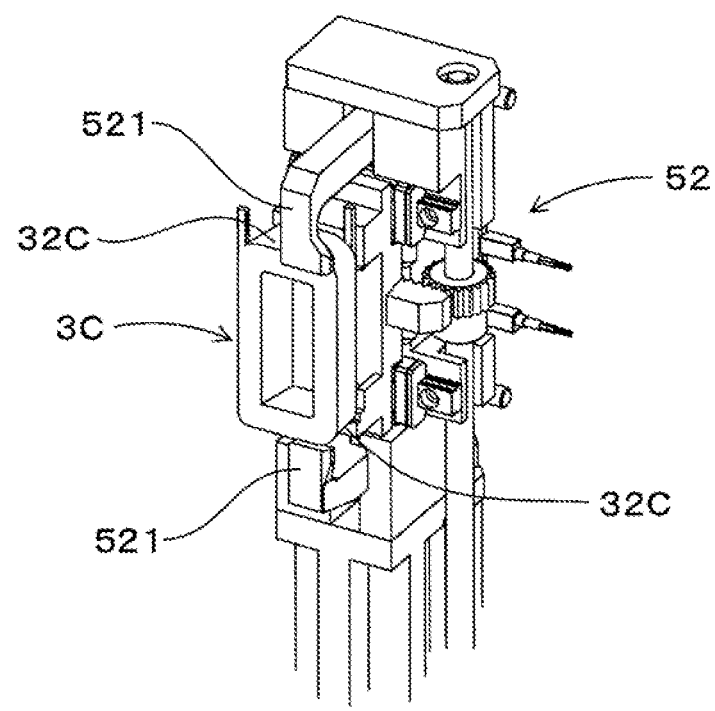
FIG. 9 is a perspective view showing a holding portion in a movable jig part of the assembly jig according to the embodiment.

As shown in FIGS. 8 and 9, the manufacturing method of the present embodiment uses an assembly jig 5 having a movable jig part 52 that holds the last coil 3C and that is placed so as to face the inner periphery of the tooth 21, and a base jig part 51 where the movable jig part 52 is movably placed. The movable jig part 52 has a holding portion 521 that supports upper and lower conductor portions 32C of the intermediate coil 3B. The movable jig part 52 can pivot with respect to the base jig part 51 by a pivot shaft portion 522 and can slide with respect to the base jig part 51 by a linear guide.

The base jig part 51 has two guide rails (guide grooves) 511 that form a path X in which the intermediate coil 3B moves when being placed on the tooth 21 of the stator core 2. The movable jig part 52 has two rollers 523 that are placed in the two guide rails 511.

In the first to fourth insertion steps of the manufacturing method, when being slid by the linear guide, the movable jig part 52 pivots about the pivot shaft portion 522 and the two rollers 523 move along the two guide rails 511, whereby the holding portion 521 of the movable jig part 52 can be moved along the path X in which the intermediate coil 3B moves. The intermediate coil 3B can be placed on the tooth 21 by the first to fourth insertion steps.

In a conventional assembly jig, after a concentrated winding coil is made to face a tooth in a tilted manner, the coil is placed on the tooth by positional control of a 2-axis moving portion. Accordingly, if the position to which a coil is attached by the assembly jig changes while repeatedly attaching a coil with the assembly jig, a program for the positional control of the 2-axis moving portion etc. need be modified every time the position to which a coil is attached changes.

On the other hand, in the assembly jig 5 of the present embodiment, the base jig part 51 having the guide rails 511 can be adjusted in position with respect to an attachment part to which the base jig part 51 is attached. For example, in a structure in which a screw inserted through a through hole formed in the base jig part 51 is tightened into a threaded hole formed in the attachment part, a clearance provided between the through hole and the screw can be made larger than that provided between the guide rail 51 and the roller 523. Accordingly, even if the attachment position to which the coil 3 is attached changes, the attachment position can be easily corrected by adjusting the position of the base jig part 51 with respect to the attachment part.

A method for placing the three-phase coils 3 on the teeth 21 of the stator core 2 and functions and effects of the present embodiment will be described below.

Figure 6:
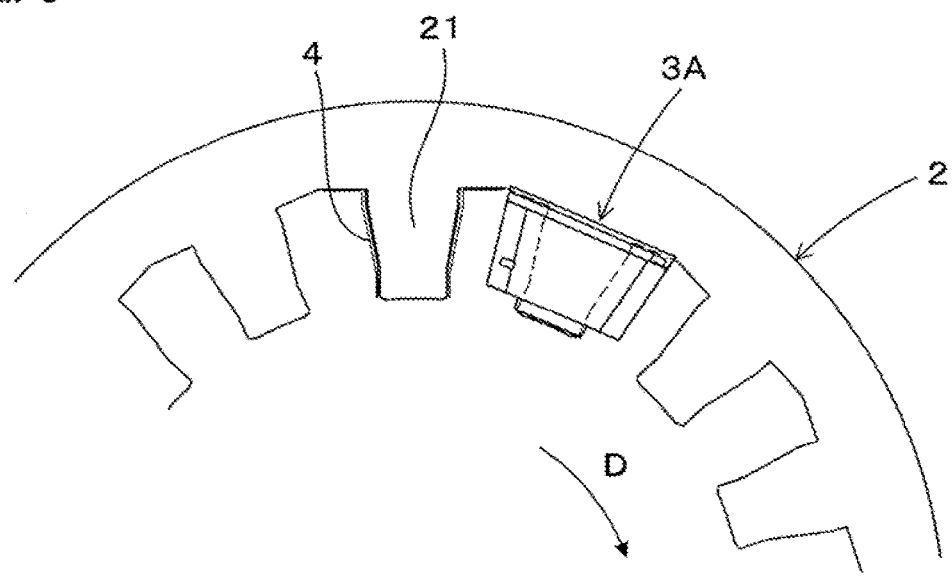
FIG. 6 is an illustration showing the state where the first coil has been placed on a tooth according to the embodiment.

In the present embodiment, the insulator 4 that is to hold the last coil 3C to be placed on the tooth 21 of the stator core 2 is first attached to the tooth 21 (see FIG. 6). The three-phase coils 3U, 3V, 3W held on the outer periphery of the insulators 4 are then sequentially placed on the teeth 21 of the stator core 2 one by one in the circumferential direction (placement direction) D (see FIG. 7). The circumferential direction D in which the three-phase coils 3U, 3V, 3W are sequentially placed one by one is the same as the other side C2 in the circumferential direction.

As shown in FIG. 6, the first coil 3A to be placed on the tooth 21 of the stator core 2 does not interfere with the coils 3 of the other phases which adjoin the first coil 3A. The first coil 3A can therefore be attached to the tooth 21 by causing the first coil 3A to directly face the inner periphery of the tooth 21 of the stator core 2 and moving parallel to the radial direction the first coil 3A toward the outer periphery. In the present embodiment, however, in order to simplify the assembly jig 5 to be used, the first coil 3A is placed on the tooth 21 by the first to fourth insertion steps similarly to the intermediate coils 3B described below.

In the present embodiment, the first and last coils 3A, 3C to be placed on the teeth 21 of the stator core 2 and the second intermediate coil 3B as the second coil to be placed on the tooth 21 are the coils that form the neutral point 34.

Next, each of the second and the following intermediate coils 3B to be placed on the teeth 21 of the stator core 2 is placed on the teeth 21 by causing the intermediate coil 3B to face the tooth 21 in a tilted manner and gradually reducing the tilt angle to cause the intermediate coil 3B to directly face the tooth 21 (see FIG. 1). Each intermediate coil 3B has been wound around the insulator 4 when being placed on the tooth 21.

The following first to fourth insertion steps are then performed to place the last coil 3C on the tooth 21 of the stator core 2. In FIGS. 1 to 5, the path X in which the last coil 3C is moved when being placed on the tooth 21 is shown regarding an outer peripheral central portion 322 of the last coil 3C.

As shown in FIG. 1, in the first insertion step, the last coil 3C is first deformed into the shape of a rhombus so that each of the outer peripheral end 321 of the one-side conductor portion 32A located on the one side C1 in the circumferential direction of the last coil 3C and the inner peripheral end 323 of the other-side conductor portion 32B located on the other side C2 in the circumferential direction of the last coil 3C has an acute-angled corner. At this time, each of an inner peripheral end 323 of the one-side conductor portion 32A and the outer peripheral end 321 of the other-side conductor portion 32B has an obtuse-angled corner. The last coil 3C is deformed by such an amount that the one-side conductor portion 32A can be inserted into the one-side slot 22A. The outer peripheral end 321 of the one-side conductor portion 32A is inserted into the opening of the one-side slot 22A located on the one side C1 in the circumferential direction of the tooth 21.

Next, as shown in FIG. 2, in the second insertion step, the outer peripheral end 321 of the one-side conductor portion 32A is inserted to the boundary position between the intermediate tilted side surface 212 and the base-end parallel side surface 213 in the one-side slot 22A while maintaining the deformed state of the last coil 3C. At this time, the outer peripheral end 321 of the other-side conductor portion 32B is also inserted into the opening of the other-side slot 22B located on the other side C2 in the circumferential direction of the tooth 21. In the second insertion step, the last coil 3C in the deformed state is placed on the tooth 21. The one-side conductor portion 32A of the last coil 3C can thus be made not to interfere with the tooth 21 or the immediately preceding coil 3B placed on the tooth 21.

As shown in FIGS. 3 and 4, in the third insertion step, the deformed last coil 3C is then returned to its original state or initial state with the outer peripheral end 321 of the one-side conductor portion 32A being held stationary. At this time, the outer peripheral end 321 of the other-side conductor portion 32B is inserted to the boundary position between the intermediate tilted side surface 212 and the base-end parallel side surface 213 in the other-side slot 22B. In the third insertion step, the last coil 3C is placed on the tooth 21 while returning the last coil 3C from the deformed shape into its original shape. The other-side conductor portion 32B of the last coil 3C can thus be made not to interfere with the first coil placed on the tooth 21.

As shown in FIG. 5, in the fourth insertion step, the last coil 3C is caused to directly face the tooth 21, and the one-side conductor portion 32A and the other-side conductor portion 32B are then moved radially outward and simultaneously inserted into the one-side slot 22A and the other-side slot 22B.

All of the three-phase coils 3A, 3B, 3C are placed on the teeth 21 of the stator core 2 in this manner.

As shown in FIG. 7, in the stator core 2, the first ends 33A and the second ends 33B of the coils 3 of the same phase which are placed on each other, the first ends 33A forming the neutral point 34, and the second ends 33B forming the lead portions 35 can be bonded by welding.

As described above, even if each tooth 21 has the base-end parallel side surfaces 213 in its base end portion having a larger width in the circumferential direction, performing the first to fourth insertion steps allows the last coil 3C to be easily placed on the tooth 21 so as to avoid interference.

Since the teeth 21 have the tip-end parallel side surfaces 211, magnetic flux passing through the teeth 21 when a current is applied to the coils is less likely to be saturated at the tip ends of the teeth 21. Moreover, forming the base-end parallel side surfaces in each tooth 21 increases the width in the circumferential direction of the base end portion of each tooth 21, allowing a large amount of magnetic flux to pass therethrough. The use of the stator core 2 having the shape of the teeth 21 can improve performance of rotating electrical machines.

In the method for manufacturing the stator 1 for a rotating electrical machine according to the present embodiment, the last coil 3C can be smoothly placed on the tooth 21 even if the tooth 21 has a larger width in the circumferential direction of its base end portion.

The invention claimed is:

1. A method for inserting a last coil of a plurality of coils on a tooth of a stator core of a stator operatively associated with an assembly jig, the method comprising the steps of:
   providing the stator core including slots and teeth, wherein each of a plurality of teeth formed in a radial pattern in an inner periphery of an annular yoke portion in the stator core has tip-end parallel side surfaces formed in a tip end portion having a constant width in a circumferential direction, has intermediate tilted side surfaces continuous with the tip-end parallel side surfaces and formed in a portion whose width in the circumferential direction increases closer to an outer periphery, and has base-end parallel side surfaces continuous with the intermediate tilted side surfaces and formed in a base end portion having a constant width in the circumferential direction, deforming in a first insertion step the last coil so that each of an outer peripheral end of a one-side conductor portion located on one side in the circumferential direction of the last coil and an inner peripheral end of the other-side conductor portion located on the other side in the circumferential direction of the last coil has an acute-angled corner, and inserting the outer peripheral end of the one-side conductor portion into an opening of a one-side slot located on the one side in the circumferential direction of the tooth, inserting in a second insertion step the outer peripheral end of the one-side conductor portion to a boundary position between the intermediate tilted side surface and the base-end parallel side surface in the one-side slot, and inserting an outer peripheral end of the other-side conductor portion into an opening of the other-side slot located on the other side in the circumferential direction of the tooth, while maintaining the deformed state of the last coil, with the outer peripheral end of the one-side conductor portion being held stationary, inserting in a third insertion step the outer peripheral end of the other-side conductor portion to a boundary position between the intermediate tilted side surface and the base-end parallel side surface in the other-side slot to return the deformed last coil to its original shape, and positioning in a fourth insertion step the last coil to face the tooth and simultaneously inserting the one-side conductor portion and the other-side conductor portion into the one-side slot and the other-side slot.

2. The method according to claim 1, wherein
the last coil is formed by winding a rectangular wire in a plurality of layers arranged in the circumferential direction so that the coil conforms to a shape of the tooth which is formed by the tip-end parallel side surfaces, the intermediate tilted side surfaces, and the base-end parallel side surfaces.

3. The method according to claim 2, wherein
the last coil is placed on an insulator that is made of an insulating resin and that has been initially attached to the tooth of the stator core.

4. The method according to claim 3, wherein
providing the assembly jig having a movable jig part that holds the last coil and configured to place the last coil so as to face an inner periphery of the tooth, and a base jig part connectively coupled to the movable jig part, and in the first to fourth insertion steps, the last coil held by the movable jig part is placed on the tooth by moving a roller provided in the movable jig part along a guide rail provided in the base jig part.

5. The method according to claim 2, wherein
providing the assembly jig having a movable jig part that holds the last coil and configured to place the last coil so as to face an inner periphery of the tooth, and a base jig part connectively coupled to the movable jig part, and in the first to fourth insertion steps, the last coil held by the movable jig part is placed on the tooth by moving a roller provided in the movable jig part along a guide rail provided in the base jig part.

6. The method according to claim 1, wherein
the last coil is placed on an insulator that is made of an insulating resin and that has been initially attached to the tooth of the stator core.

7. The method according to claim 6, wherein
providing the assembly jig having a movable jig part that holds the last coil and configured to place the last coil so as to face an inner periphery of the tooth, and a base jig part connectively coupled to the movable jig part, and in the first to fourth insertion steps, the last coil held by the movable jig part is placed on the tooth by moving a roller provided in the movable jig part along a guide rail provided in the base jig part.

8. The method according to claim 1, wherein
the method uses an assembly jig having a movable jig part that holds the last coil and that is placed so as to face an inner periphery of the tooth, and a base jig part where the movable jig part is movably placed, and in the first to fourth insertion steps, the last coil held by the movable jig part is placed on the tooth by moving a roller provided in the movable jig part along a guide rail provided in the base jig part.

* * * * *